J. N. Bolles,
Shaft Coupling.
Nº 47,613.                    Patented May 9, 1865.
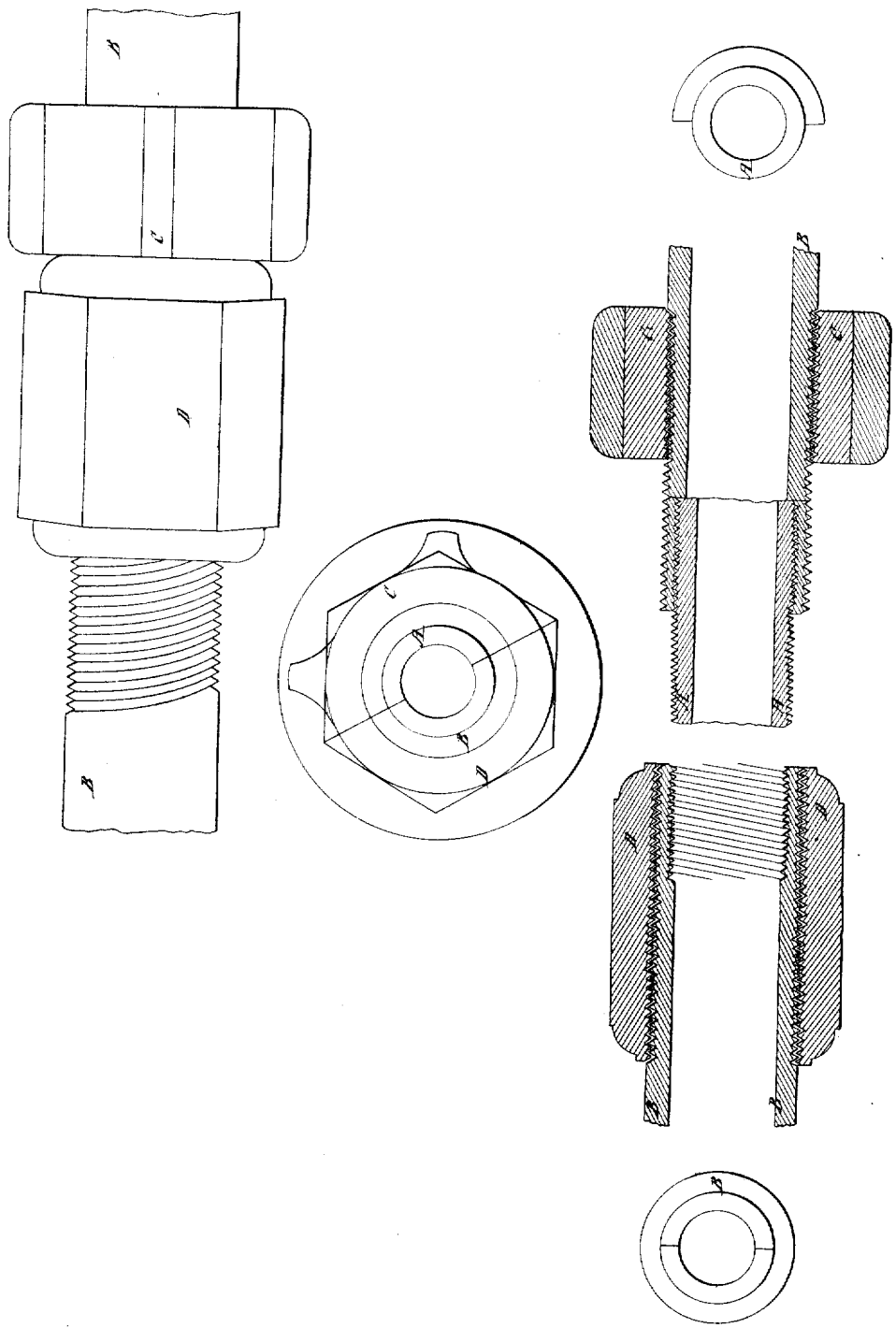

UNITED STATES PATENT OFFICE.

JESSE N. BOLLES, OF BALTIMORE, MARYLAND.

COUPLING-SHAFT OF BORING-TOOLS.

Specification forming part of Letters Patent No. 47,613, dated May 9, 1865.

*To all whom it may concern:*

Be it known that I, JESSE N. BOLLES, of Baltimore, in the county of Baltimore, in the State of Maryland, have invented a new and improved mode for preventing boring or drilling rods from disconnecting while in operation; and I do hereby declare that the following is a full and exact description thereof, reference being had to the accompanying drawings, and to the letters of reference marked thereon.

The nature of my invention consists in the adjustment of either right and left hand threads or outer and inner screws of different sizes, whether right or left, as applied to the ends of round, square, hollow, or solid boring or drilling rods, so as to render it impossible for the rods to separate while in the act of boring or drilling.

To enable others skilled in the art to make and use my invention, I will proceed to describe its construction and operation.

I construct my safety-joints for uniting boring or drilling rods when hollow, first, by cutting a left-hand three thread upon a nipple, A, which is tightly secured inside the upper end of a drill-rod, B, projecting one and a half inches upward. I then cut a right-hand three-thread upon the outside of the upper end of the same rod extending four inches downward, upon which I screw a collar, C, two inches long, which collar has four wings, which I secure tightly, leaving two inches of the outer thread also projecting upward. The winged collar forms a shoulder by which the rods are secured while connecting and disconnecting them, and their wings serve as fenders and keep the rods in the center of the drill-hole. Then inside the lower end of each rod I cut a left-hand three-thread corresponding with that upon the nipple. I also cut upon the outside of the same rod a right-hand three-thread four inches or more upward, upon which I place a four-inch coupling or lock-nut, D, with right-hand threads corresponding with those on the rods. This lock-nut for convenience I make hexagonal, but it may be of any other outer form which may be run down easily by the hand to the collar and over the left-hand nipple-joint, which must have been tightly turned up to its shoulder by a wrench so as to make a perfectly-tight joint. This joint must so be made before the outer thread upon the upper end of the lower rod is cut, which is done by running down the die from the upper rod (while the joint is hard up) upon the lower rod, so as to match therewith, and should so be marked upon both the upper and lower rods in a line, so as to be easily seen. When the lock-joint is thus made, whether with hollow, solid, round, or square rods, it will be impossible for them to unscrew while in operation. The same principle may also be applied to the connection of the various tools with the rods, thus insuring their safety, while the three-thread double joints may be made in the same time as required for the old single joint.

What I claim as my invention, and desire to secure by Letters Patent, is—

The adaptation of a safety-joint to either round, square, hollow, or solid boring or drilling rods (and the various tools connected therewith) for boring or drilling rods used in the construction of Artesian wells, oil-wells, and for other purposes, so adjusted with right and left hand threads or outer and inner screws of different sizes (whether right or left hand) with nipple, lock-nut, and collar, so as to render disconnection of the rods impossible while in operation, as herein described, or any other mode substantially the same which will produce the intended effect.

JESSE NORRIS BOLLES.

Witnesses:
JOSEPH MASON,
CHARLES MCMULLIN.